United States Patent
Beagen et al.

(10) Patent No.: US 10,835,772 B2
(45) Date of Patent: Nov. 17, 2020

(54) SPRINKLER DROP BRACKET FOR INTERSECTING DOWNLIGHT

(71) Applicant: Anvil International, LLC, Exeter, NH (US)

(72) Inventors: Joseph Beagen, Providence, RI (US); Odair Dafonseca, Pawtucket, RI (US)

(73) Assignee: Anvil International, LLC, Exeter, NH (US)

( * ) Notice: Subject to any disclaimer, the term of this patent is extended or adjusted under 35 U.S.C. 154(b) by 0 days.

(21) Appl. No.: 16/540,544

(22) Filed: Aug. 14, 2019

(65) Prior Publication Data

US 2019/0366139 A1    Dec. 5, 2019

Related U.S. Application Data

(60) Division of application No. 15/987,355, filed on May 23, 2018, now Pat. No. 10,426,985, which is a continuation of application No. 15/617,389, filed on Jun. 8, 2017, now Pat. No. 10,010,731.

(51) Int. Cl.
| | |
|---|---|
| *B05B 15/62* | (2018.01) |
| *E04B 9/14* | (2006.01) |
| *F16L 3/00* | (2006.01) |
| *A62C 35/68* | (2006.01) |
| *E04B 9/00* | (2006.01) |

(52) U.S. Cl.
CPC .............. *A62C 35/68* (2013.01); *B05B 15/62* (2018.02); *E04B 9/14* (2013.01); *F16L 3/003* (2013.01); *E04B 9/006* (2013.01)

(58) Field of Classification Search
CPC ......... A62C 35/68; B05B 15/62; E04B 9/006; F16L 3/24

USPC .............................. 248/65, 73, 72, 74.2, 74.3
See application file for complete search history.

(56) References Cited

U.S. PATENT DOCUMENTS

| | | | | |
|---|---|---|---|---|
| 796,178 | A | * | 8/1905 | Beaton ...................... F16L 3/00 248/57 |
| 833,613 | A | * | 10/1906 | Maiser ...................... F16L 3/00 248/57 |
| 949,576 | A | * | 2/1910 | Hunter ...................... F16L 3/00 248/57 |
| 3,536,281 | A | | 10/1970 | Meehan et al. |
| 3,696,571 | A | * | 10/1972 | Schluter .................... E04B 9/14 52/144 |

(Continued)

FOREIGN PATENT DOCUMENTS

| | | |
|---|---|---|
| JP | 03183846 | 8/1991 |
| JP | 08238331 | 9/1996 |

(Continued)

OTHER PUBLICATIONS

Beagen, Joseph; Issue Notification for U.S. Appl. No. 15/617,389, filed Jun. 8, 2017, dated Jun. 13, 2018, 1 pg.

(Continued)

*Primary Examiner* — Brent W Herring
(74) *Attorney, Agent, or Firm* — Taylor English Duma LLP

(57) ABSTRACT

A method for mounting a bracket assembly on a suspension frame, the method including attaching a main body of the bracket assembly to the suspension frame; and attaching a support arm of the bracket assembly to a ceiling grid support element of the suspension frame, the support arm extending outward from the main body.

18 Claims, 6 Drawing Sheets

(56) References Cited

U.S. PATENT DOCUMENTS

| | | | | |
|---|---|---|---|---|
| 3,703,307 A * | 11/1972 | Curtis | E04B 9/14 | 403/173 |
| 3,785,110 A * | 1/1974 | Galloway | E04B 9/14 | 52/715 |
| 3,848,385 A | 11/1974 | Thompson | | |
| 4,041,657 A * | 8/1977 | Schuplin | E04B 9/006 | 52/39 |
| 4,570,391 A * | 2/1986 | Quante | B01D 46/12 | 52/105 |
| 4,791,993 A * | 12/1988 | Curran | A62C 37/10 | 169/16 |
| 4,834,186 A * | 5/1989 | Ballard | A62C 37/09 | 169/16 |
| 5,331,785 A * | 7/1994 | Brak | E04B 9/14 | 52/506.06 |
| 5,354,952 A * | 10/1994 | Hickey | H02G 3/06 | 174/503 |
| 5,396,959 A * | 3/1995 | Macdonald, III | A62C 35/68 | 169/16 |
| D357,544 S * | 4/1995 | Spransy | D25/119 | |
| 5,426,901 A | 6/1995 | Indracek | | |
| 5,542,713 A * | 8/1996 | Miyazaki | F16L 3/04 | 285/136.1 |
| 5,698,820 A * | 12/1997 | Collard | H02G 3/10 | 174/57 |
| 5,699,641 A * | 12/1997 | Tinen | E04B 9/006 | 248/343 |
| 5,711,551 A * | 1/1998 | Miyazaki | F16L 3/04 | 285/136.1 |
| 5,725,185 A | 3/1998 | Auclair | | |
| 5,883,332 A * | 3/1999 | Collard | H02G 3/10 | 174/57 |
| 5,979,068 A | 11/1999 | Andrews | | |
| 6,119,784 A * | 9/2000 | MacDonald, III | A62C 35/68 | 169/16 |
| 6,123,154 A * | 9/2000 | MacDonald, III | A62C 35/68 | 169/16 |
| 6,158,519 A * | 12/2000 | Kretschmer | A62C 35/645 | 169/16 |
| 6,260,810 B1 * | 7/2001 | Choi | A62C 35/68 | 248/317 |
| 6,286,265 B1 * | 9/2001 | Rinderer | E04B 9/006 | 52/28 |
| 6,341,466 B1 * | 1/2002 | Kehoe | E04B 9/006 | 24/292 |
| 6,488,097 B1 * | 12/2002 | MacDonald, III | A62C 35/68 | 169/16 |
| 6,554,231 B2 * | 4/2003 | Choi | E04B 9/006 | 248/317 |
| 6,752,218 B2 * | 6/2004 | MacDonald, III | A62C 35/68 | 169/16 |
| 6,811,130 B1 | 11/2004 | Oh | | |
| 7,090,174 B2 | 8/2006 | Korczak et al. | | |
| 7,240,884 B2 | 7/2007 | Shim | | |
| 7,255,315 B2 * | 8/2007 | Oh | A62C 35/68 | 169/43 |
| 7,427,051 B2 * | 9/2008 | Oh | F16L 3/24 | 248/72 |
| 7,506,845 B2 * | 3/2009 | Oh | F16L 3/24 | 248/72 |
| 7,510,159 B2 * | 3/2009 | Rippel | H02G 3/125 | 248/323 |
| 7,735,787 B2 * | 6/2010 | Kafenshtok | E04B 9/001 | 169/37 |
| 7,735,794 B1 * | 6/2010 | Gretz | E04B 9/006 | 248/200.1 |
| 7,784,746 B2 | 8/2010 | Kafenshtok et al. | | |
| 7,878,464 B2 * | 2/2011 | Oh | B05B 15/62 | 248/65 |
| 7,956,285 B2 * | 6/2011 | Tally | H02G 1/00 | 174/53 |
| 8,109,482 B2 | 2/2012 | Oh | | |
| 8,272,615 B2 * | 9/2012 | Silcox | A62C 35/68 | 248/342 |
| 8,474,199 B2 * | 7/2013 | Oh | A62C 35/68 | 248/343 |
| 8,500,079 B2 * | 8/2013 | Oh | A62C 35/68 | 239/283 |
| 8,528,292 B2 | 9/2013 | Morey | | |
| 8,615,947 B2 | 12/2013 | Underkofler et al. | | |
| 8,678,330 B2 * | 3/2014 | Silcox | A62C 35/68 | 248/200.1 |
| 8,720,147 B2 * | 5/2014 | Roman | E04B 9/18 | 52/506.07 |
| 8,740,158 B2 * | 6/2014 | Silcox | A62C 35/68 | 169/37 |
| 8,833,718 B2 * | 9/2014 | Oh | A62C 35/68 | 239/283 |
| 8,955,273 B1 * | 2/2015 | Lehane, Jr. | E04B 9/122 | 52/220.6 |
| RE45,399 E | 3/2015 | Kafenshtok et al. | | |
| 9,004,421 B2 * | 4/2015 | Feenstra | A62C 35/68 | 248/200.1 |
| 9,004,422 B2 * | 4/2015 | Feenstra | A62C 35/68 | 248/200.1 |
| 9,109,724 B2 * | 8/2015 | Meissner | F16L 3/1091 | |
| 9,174,077 B2 * | 11/2015 | Lim | A62C 35/68 | |
| 9,278,238 B2 | 3/2016 | Thau, Jr. et al. | | |
| 9,718,076 B2 | 8/2017 | Oh | | |
| 9,889,327 B2 * | 2/2018 | Mitchell | F16L 3/1075 | |
| 10,006,613 B2 * | 6/2018 | Oudina | F21V 21/048 | |
| 10,010,731 B1 * | 7/2018 | Beagen | A62C 35/68 | |
| 10,016,644 B2 * | 7/2018 | Seo | F16L 3/24 | |
| 10,082,279 B2 * | 9/2018 | Jones | F21V 21/044 | |
| 10,173,088 B2 | 1/2019 | Chong | | |
| 10,279,367 B2 | 5/2019 | Dafonseca et al. | | |
| 10,328,296 B2 | 6/2019 | Chong | | |
| 10,426,985 B2 | 10/2019 | Beagen et al. | | |
| 10,426,986 B2 | 10/2019 | Chong | | |
| 10,527,203 B2 | 1/2020 | Dafonseca et al. | | |
| 10,603,771 B2 | 3/2020 | Connery et al. | | |
| 10,610,716 B2 | 4/2020 | Beagen et al. | | |
| 2002/0066834 A1 * | 6/2002 | Choi | E04B 9/006 | 248/65 |
| 2003/0089828 A1 | 5/2003 | Korczak et al. | | |
| 2005/0139743 A1 | 6/2005 | Shim | | |
| 2006/0249633 A1 | 11/2006 | Korczak et al. | | |
| 2008/0099640 A1 | 5/2008 | Kafenshtok et al. | | |
| 2010/0096524 A1 | 4/2010 | Kafenshtok et al. | | |
| 2011/0094760 A1 | 4/2011 | Im | | |
| 2011/0154755 A1 * | 6/2011 | Oh | A62C 35/68 | 52/220.8 |
| 2011/0155865 A1 | 6/2011 | Oh | | |
| 2011/0260012 A1 * | 10/2011 | Oh | A62C 35/68 | 248/89 |
| 2011/0284098 A1 | 11/2011 | Silcox et al. | | |
| 2011/0315409 A1 * | 12/2011 | Silcox | A62C 35/68 | 169/51 |
| 2012/0167514 A1 * | 7/2012 | Lehane, Jr. | E04B 9/0478 | 52/506.07 |
| 2012/0217354 A1 | 8/2012 | Walraven et al. | | |
| 2012/0298384 A1 | 11/2012 | Silcox et al. | | |
| 2013/0048822 A1 | 2/2013 | Liu et al. | | |
| 2013/0105640 A1 * | 5/2013 | Feenstra | A62C 35/68 | 248/75 |
| 2013/0105641 A1 * | 5/2013 | Feenstra | A62C 35/68 | 248/75 |
| 2013/0291461 A1 * | 11/2013 | Oh | A62C 35/68 | 52/220.6 |
| 2013/0318905 A1 | 12/2013 | Underkofler et al. | | |
| 2014/0231103 A1 | 8/2014 | Savage et al. | | |
| 2015/0040495 A1 * | 2/2015 | Lehane, Jr. | E04B 9/122 | 52/220.6 |
| 2015/0060613 A1 * | 3/2015 | Lim | A62C 35/68 | 248/75 |
| 2015/0377386 A1 * | 12/2015 | Mitchell | F16L 3/1075 | 169/51 |
| 2016/0010764 A1 | 1/2016 | Dworak, Jr. et al. | | |
| 2016/0047496 A1 | 2/2016 | O'Connell | | |

(56) References Cited

U.S. PATENT DOCUMENTS

| | | | |
|---|---|---|---|
| 2016/0175632 A1 | 6/2016 | Savage et al. | |
| 2016/0221018 A1 | 8/2016 | Oh | |
| 2016/0289964 A1* | 10/2016 | Engberg | E04B 9/10 |
| 2016/0296778 A1* | 10/2016 | Seo | F16L 3/24 |
| 2017/0165511 A1 | 6/2017 | Meyer et al. | |
| 2017/0197101 A1 | 7/2017 | Chong | |
| 2017/0307188 A1* | 10/2017 | Oudina | F21V 21/048 |
| 2017/0336058 A1* | 11/2017 | Jones | F21V 21/044 |
| 2018/0099167 A1 | 4/2018 | Dafoneseca et al. | |
| 2018/0100527 A1 | 4/2018 | Dafonseca et al. | |
| 2018/0100607 A1* | 4/2018 | Dafonseca | A62C 35/68 |
| 2018/0353787 A1* | 12/2018 | Beagen | A62C 35/68 |
| 2019/0022443 A1 | 1/2019 | Beagen et al. | |
| 2019/0118014 A1 | 4/2019 | Chong | |
| 2019/0118015 A1 | 4/2019 | Chong | |
| 2019/0262853 A1 | 8/2019 | Dafonseca et al. | |
| 2019/0366140 A1 | 12/2019 | Beagen et al. | |
| 2020/0080665 A1 | 3/2020 | Dafonseca et al. | |
| 2020/0096137 A1 | 3/2020 | Dafonseca et al. | |
| 2020/0188716 A1 | 6/2020 | Beagan, Jr. et al. | |
| 2020/0188717 A1 | 6/2020 | Beagan, Jr. | |
| 2020/0191325 A1 | 6/2020 | Roberts | |

FOREIGN PATENT DOCUMENTS

| | | |
|---|---|---|
| JP | 11244409 | 9/1999 |
| JP | 2000317008 | 11/2000 |
| WO | 2018226525 | 12/2018 |

OTHER PUBLICATIONS

Beagen, Joseph; Non-Final Office Action for U.S. Appl. No. 15/617,389, filed Jun. 8, 2017, dated Dec. 28, 2017, 11 pgs.

Beagen, Joseph; Notice of Allowance for U.S. Appl. No. 15/617,389, filed Jun. 8, 2017, dated Feb. 23, 2018, 9 pgs.

Beagen, Joseph; Corrected Notice of Allowance for U.S. Appl. No. 15/987,355, filed May 23, 2018, dated Aug. 23, 2019, 7 pgs.

Beagen, Joseph; Final Office Action for U.S. Appl. No. 15/987,355, filed May 23, 2018, dated Mar. 14, 2019, 14 pgs.

Beagen, Joseph; Non-Final Office Action for U.S. Appl. No. 15/987,355, filed May 23, 2018, dated Nov. 9, 2018, 20 pgs.

Beagen, Joseph; Notice of Allowance for U.S. Appl. No. 15/987,355, filed May 23, 2018, dated May 17, 2019, 5 pgs.

Beagen, Joseph; Final Office Action for U.S. Appl. No. 16/140,676, filed Sep. 25, 2018, dated Oct. 22, 2019, 12 pgs.

Beagen, Joseph; Non-Final Office Action for U.S. Appl. No. 16/140,676, filed Sep. 25, 2018, dated Aug. 1, 2019, 29 pgs.

Beagen, Joseph; International Search Report and Written Opinion for PCT Application No. PCT/US18/35579, filed Jun. 1, 2018, dated Aug. 29, 2018, 7 pgs.

Installation Instructions Document entitled 'USAI Connect Housing Installation Use With Armstrong 4" Intersection Downlighting Kit' (USAI, LLC) 2016, Entire document.

Beagen, Joseph; Notice of Allowance for U.S. Appl. No. 16/140,676, filed Sep. 25, 2018, dated Jan. 21, 2020, 13 pgs.

Beagen, Joseph; International Preliminary Report on Patentability for PCT Application No. PCT/US18/35579, filed Jun. 1, 2018, dated Dec. 19, 2019, 6 pgs.

Beagen, Joseph; Corrected Notice of Allowance for U.S. Appl. No. 16/140,676, filed Sep. 25, 2018, dated Mar. 9, 2020, 6 pgs.

Beagen, Joseph; Non-Final Office Action for U.S. Appl. No. 16/796,793, filed Feb. 20, 2020, dated Apr. 10, 2020, 9 pgs.

Beagen, Joseph; Non-Final Office Action for U.S. Appl. No. 16/540,612, filed Aug. 14, 2019, dated Mar. 23, 2020, 24 pgs.

Beagen, Joseph; Final Office Action for U.S. Appl. No. 16/796,793, filed Feb. 20, 2020, dated Jul. 10, 2020, 24 pgs.

Beagen, Joseph; Corrected Notice of Allowance for U.S. Appl. No. 16/540,612, filed Aug. 14, 2019, dated Aug. 27, 2020, 7 pgs.

Beagen, Joseph; Notice of Allowance for U.S. Appl. No. 16/540,612, filed Aug. 14, 2019, dated Jun. 30, 2020, 14 pgs.

Beagen, Joseph; Notice of Allowance for U.S. Appl. No. 16/796,808, filed Feb. 20, 2020, dated Sep. 30, 2020, 29 pgs.

* cited by examiner

SPRINKLER DROP BRACKET FOR INTERSECTING DOWNLIGHT

CROSS-REFERENCE TO RELATED APPLICATIONS

This application is a divisional of U.S. application Ser. No. 15/987,355, filed May 23, 2018, which is a continuation of U.S. application Ser. No. 15/617,389, filed Jun. 8, 2017, now U.S. Pat. No. 10,010,731, issued Jul. 3, 2018, each of which is hereby incorporated by reference herein in their entireties.

BACKGROUND OF THE DISCLOSURE

Field of the Disclosure

The present disclosure relates to fire protection sprinkler drop support systems and, more particularly, to a sprinkler drop bracket for an intersecting downlight.

Discussion of Related Art

A typical automatic fire sprinkler system includes a network of pipes that carry a fire suppression fluid, e.g., water, to one or more rooms in a building. Conduit sections carry the fluid from the pipes to sprinkler heads strategically located in different rooms. The position and orientation of each sprinkler head is typically maintained in place by a support assembly. When the room reaches an elevated temperature due to a fire, the sprinkler head is activated, allowing a stream of fire suppression fluid to be directed over the intended area of coverage. The support assembly is used to hold the sprinkler securely in place during operation.

Some known sprinkler support assemblies are designed to be secured to a ceiling structure by fasteners. In grid-type ceiling systems, the sprinkler head typically extends through an opening in a central area of one or more ceiling tiles. This may be undesirable, however, in grid-type ceiling systems employing lighting fixtures (e.g., downlights) at an intersection of two or more ceiling tiles. One such prior art ceiling system is shown in FIG. 1. The ceiling system 10 includes a downlight suspension frame 12 connecting 4 (four) ceiling grid supports 14. The downlight suspension frame 12 and ceiling grid supports 14 are coupled to a yoke 18, which is suspended by a wire or cable 20. The yoke 18 may be secured atop two or more ceiling grid supports 14 by a set of brackets 24. A lighting fixture (not shown) may be disposed within a central area 30 of the downlight suspension frame 12 to illuminate an area below the ceiling system 10.

SUMMARY OF THE DISCLOSURE

In view of the foregoing, there is a need in the art for a bracket for coupling a fire sprinkler assembly to a downlight suspension frame of a ceiling grid system, wherein the bracket is easier to install and meets all fire safety industry requirements.

One approach according to the disclosure includes a fire sprinkler support assembly having a suspension frame coupled between a plurality of ceiling grid support elements, and a bracket assembly coupled to the suspension frame and to at least one of the plurality of ceiling grid support elements. The bracket assembly may include a main body coupled to the suspension frame, and a support arm extending laterally from the main body, the support arm including a set of seating members coupled to the at least one of the plurality of ceiling grid support elements. The fire sprinkler support assembly further includes a sprinkler drop coupled to the support arm, the sprinkler drop extending through the main body and into the suspension frame.

Another approach according to the disclosure includes a bracket assembly having a main body coupled to a lighting fixture suspension frame by a first set of seating members, the main body including a central opening for receiving a sprinkler drop. The bracket assembly further includes a support arm extending laterally from the main body, the support arm including a shaft and a second set of seating members extending from the shaft for coupling the support arm to a ceiling grid support element.

Yet another approach according to the disclosure includes a fire sprinkler support assembly having a suspension frame coupled at an intersection of a plurality of ceiling grid support elements, and a bracket assembly coupled to the suspension frame and to at least one of the plurality of ceiling grid support elements. The bracket assembly may include a main body extending partially into the suspension frame, the main body including a first set of seating members and a central opening, and a support arm extending laterally from the main body, the support arm including a second set of seating members coupled to the at least one of the plurality of ceiling grid support elements.

Still yet another approach according to the disclosure includes a fire sprinkler support assembly having a suspension frame centrally coupled between a plurality of ceiling grid support elements, and a bracket assembly coupled atop the suspension frame. The bracket assembly may include a sprinkler head disposed within a central opening of the suspension frame.

Still yet another approach according to the disclosure includes a method for mounting a bracket assembly on a suspension frame. The method can include attaching a main body of the bracket assembly to the suspension frame; and attaching a support arm of the bracket assembly to a ceiling grid support element of the suspension frame. The support arm can extend outward from the main body.

BRIEF DESCRIPTION OF THE DRAWINGS

The accompanying drawings illustrate exemplary approaches of the disclosure, including the practical application of the principles thereof, and in which.

Figure 1:
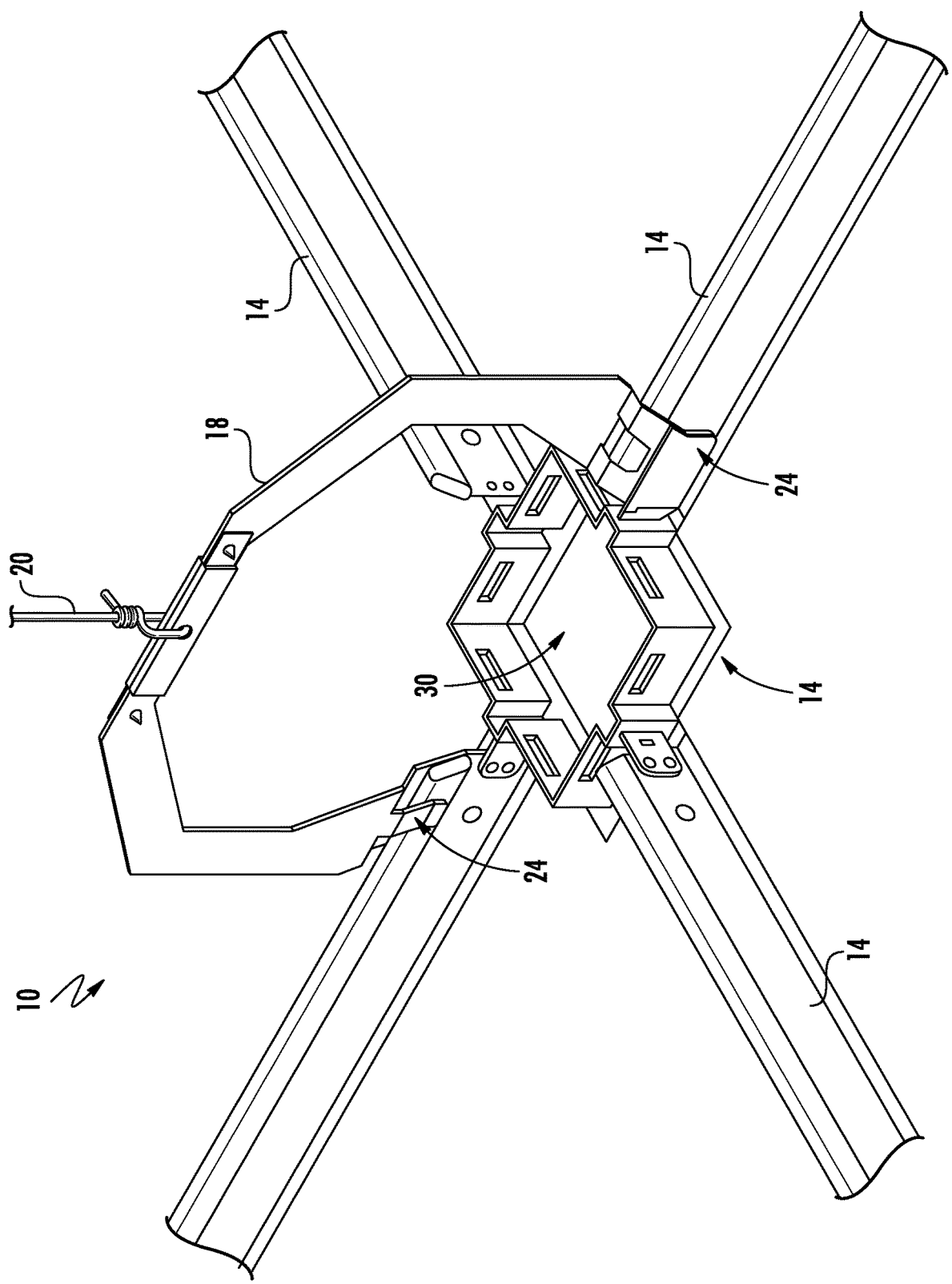
FIG. 1 is a perspective view of a prior art ceiling system including a downlight suspension frame connecting a set of ceiling grid supports.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the disclosed torch handle may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, in the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As stated above, provided herein is a snap-to-grid bracket assembly for use with a fire suppression device. In one approach, a sprinkler support assembly includes a suspension frame coupled to a plurality of ceiling grid support elements, and a bracket assembly coupled to the suspension frame and to at least one of the plurality of ceiling grid support elements. The bracket assembly may include a main body extending partially into a central area of the suspension frame, the main body including a first set of seating members and a central opening. The bracket assembly may further include a support arm extending laterally from the main body, the support arm including a second set of seating members coupled to the at least one of the plurality of ceiling grid support elements. The sprinkler support assembly may be a retrofit solution that couples to an existing suspension frame of a downlight fixture.

Embodiments of the disclosure are compatible with a ceiling system including an overhead ceiling grid support system configured to be mounted in a suspended manner from an overhead building support structure via suitable hanger elements, such as for example, without limitation, fasteners, hangers, wires, cables, rods, struts, etc. The overhead ceiling grid support system includes a plurality of grid support members intersecting at a lighting fixture suspension frame. The ceiling grid support elements and/or the suspension frame may be hung by one or more hanger elements from the overhead building support structure and provide support for a portion of a fire suppression system, e.g., a sprinkler drop, a sprinkler heard, etc.

The ceiling grid support elements may be arranged to form an array of grid openings which receive and are essentially closed by ceiling tiles or panels when positioned within the grid openings. In some embodiments, ceiling grid support elements may be arranged in an orthogonal pattern and intersect at right angles (i.e. perpendicular) to form the grid openings which are rectilinear, such as squares or rectangles (in top plan view). The grid openings may be substantially coextensive with the length and width of the ceiling panels to be installed in the grid openings. The ceiling panels may be any type of ceiling panel, including without limitation, square edge panels, stepped tegular edge panels creating a reveal, or other. The ceiling panels may be constructed of any suitable material or combinations of different materials. Some non-limiting examples of ceiling panel materials that may be used include, without limitation, mineral fiber board, fiberglass, metals, polymers, wood, composites, combinations thereof, or other.

Exemplary embodiments of bracket assemblies for fire sprinkler support assemblies described herein may be designed for a T-bar suspended beam. When installing the bracket assembly onto the T-bar body and the suspension frame, an installer can "snap" the bracket assembly into place. In some embodiments, once the bracket assembly is positioned in place, the installer can further secure/anchor the bracket assembly to the T-bar beam using one or more fasteners. To un-anchor the bracket assembly from the T-bar beam, the installer may disengage/loosen/release the fastener to unlock the seating frame from the T-bar beam.

Figure 2:
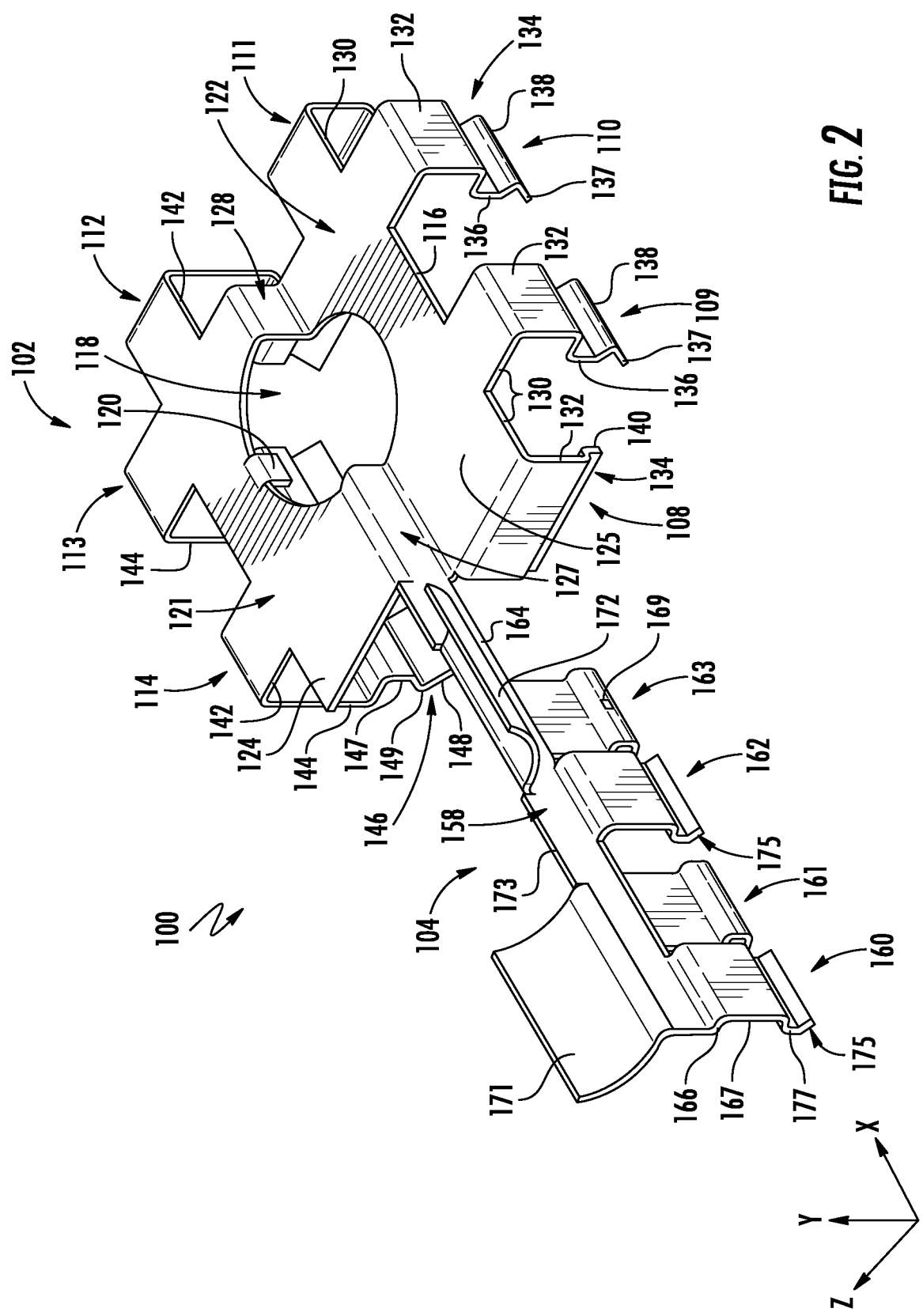
FIG. 2 is a perspective view of a bracket assembly according to approaches of the disclosure.
Figure 3:
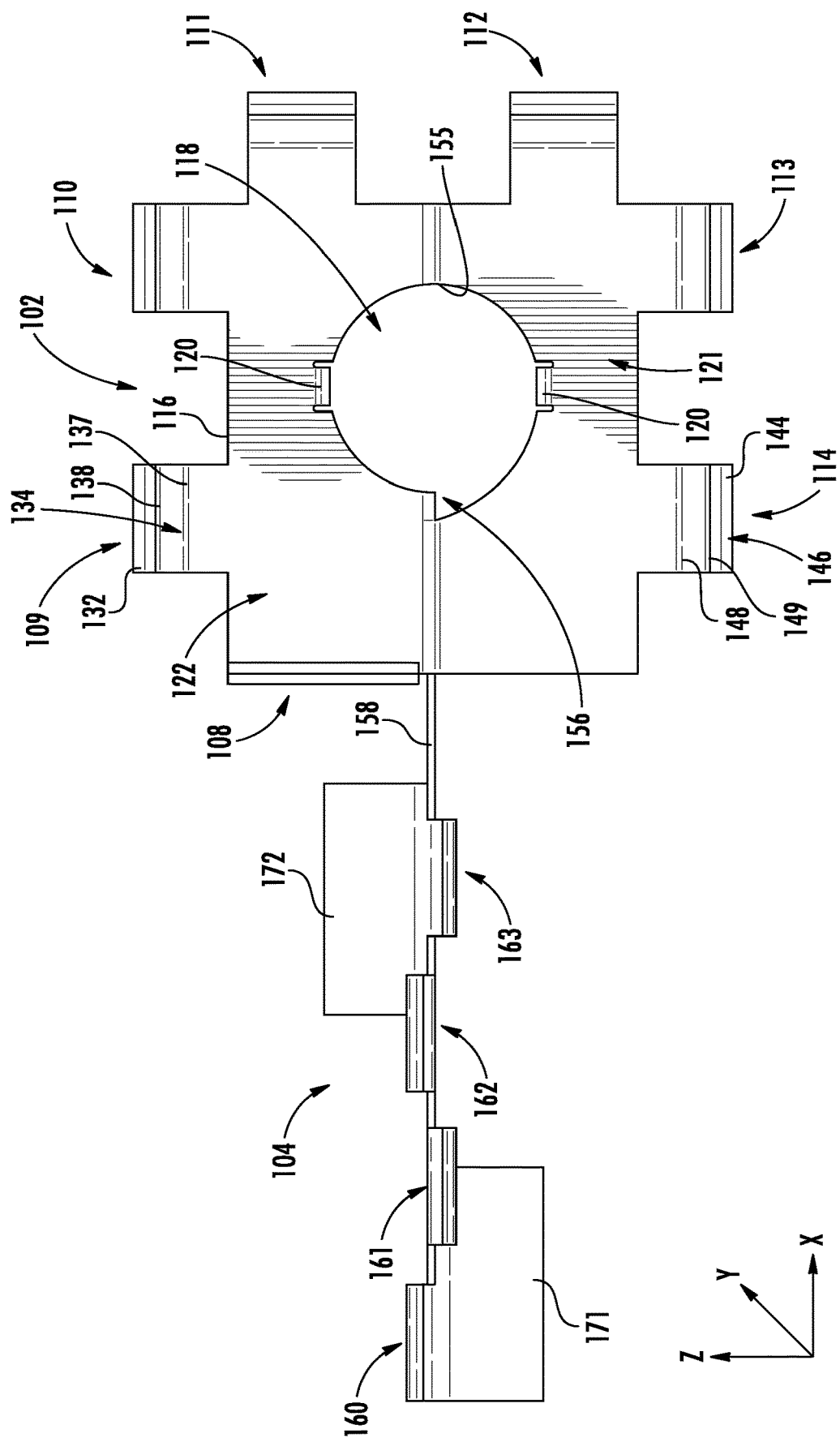
FIG. 3 is a bottom view of the bracket assembly of FIG. 2 according to approaches of the disclosure.
Figure 4:
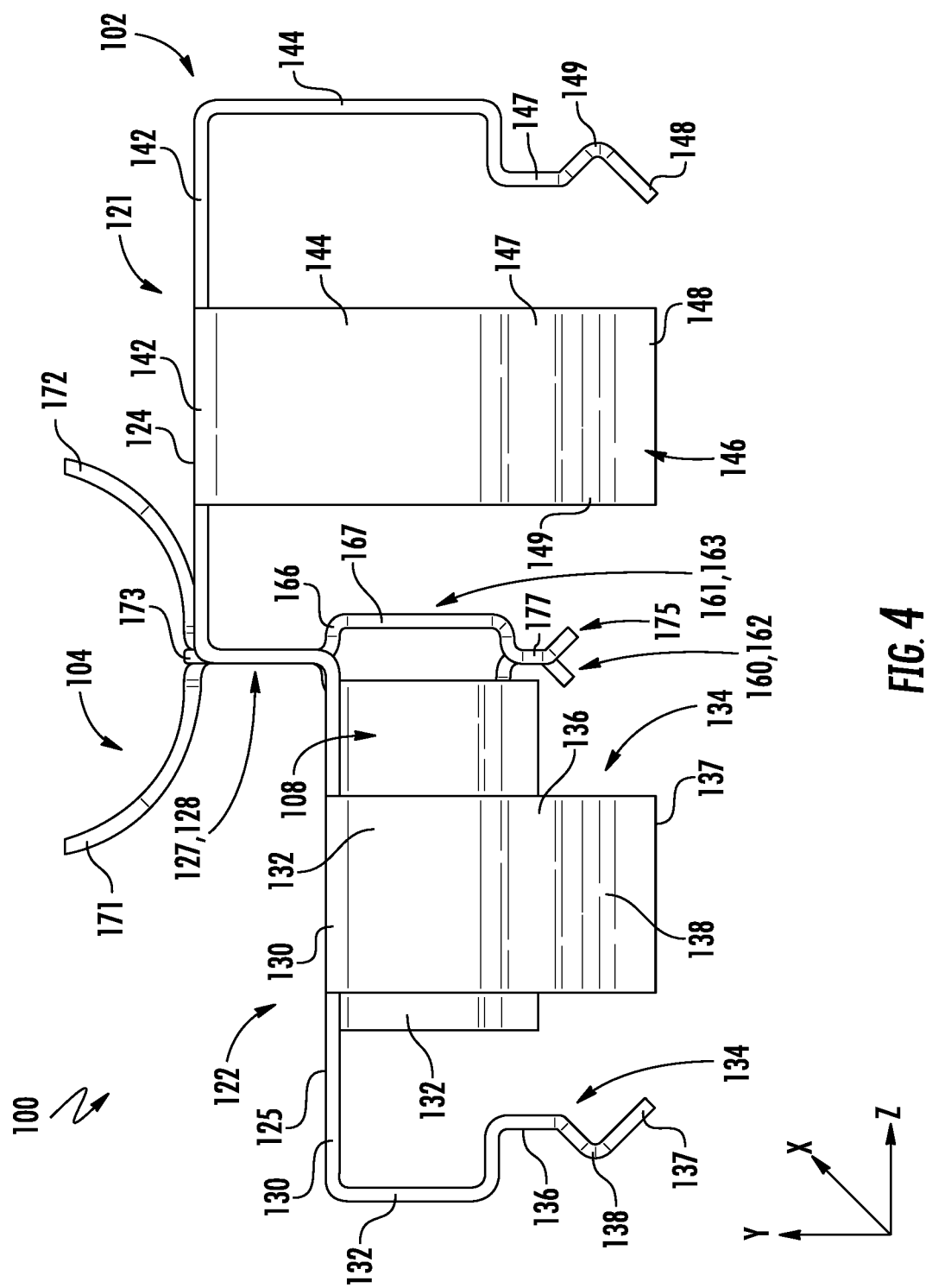
FIG. 4 is an end view of the bracket assembly of FIG. 2 according to approaches of the disclosure.

Turning now to FIGS. 2-4, a bracket assembly 100 of a fire sprinkler support assembly (hereinafter "support assembly") will be described in greater detail. As shown, the bracket assembly 100 may include a main body 102 coupleable with a suspension frame (e.g., a downlight suspension frame), and a support arm 104 extending laterally (e.g., along the x-axis) from the main body 102. As will be described in greater detail below, the support arm 104 and the main body 102 may support a sprinkler drop of a fire suppression system. The main body 102 may include a first set of seating members 108-114 (also referred to herein as "main body seating members") extending from an outer perimeter 116, and a central opening 118 including at least one fastener 120 (e.g., clip or clasp) for securing the sprinkler drop therein.

The main body 102 and the support arm 104 may be made of a suitable material including metal and non-metal. In one embodiment, the bracket assembly 100 is made of a flat metal plate or sheet of material formed to shape, such as without limitation aluminum, titanium, steel. In one implementation, the bracket assembly 100 is made of cold rolled steel which may be coated for corrosion resistance. The main body 102 and the support arm 104 may have the same or different thicknesses. Furthermore, the bracket assembly 100 may be formed and machined by any suitable metal fabrication method such as bending, stamping, rolling, forging, casting, cutting, milling, welding, soldering, or combinations thereof. A non-metal bracket assembly 100 may be formed by suitable methods, including without limitation, molding and others.

As shown, the main body 102 includes first and second sections 121, 122 on opposite sides of the central opening 118. A top surface 124 of the first section 121 defines a first plane (e.g., x-z plane), and a top surface 125 of the second section 122 defines a second plane (e.g., x-z plane), wherein the first plane and the second plane are parallel to one another. The first and second sections 121, 122 are connected by risers 127 and 128, which may be oriented perpendicular to the first and second planes. As shown, the top surface 124 of the first section 121 is vertically higher (e.g., along the y-axis) than the top surface 125 of the second section 122 so as to provide additional support for the sprinkler drop.

In some examples, each of the first set of seating members 108-114 extends laterally (e.g., along x-axis and z-axis) from the perimeter 116 of the main body 102. More specifically, each of seating members 108-111 of the second section 122 includes a first section 130 extending outwardly from the main body 102, for example, along the second plane defined by the top surface 125. A second section 132 extends perpendicularly, or substantially perpendicularly, from the first section 130, and a third section 134 extends from the second section 132. In some embodiments, the third section 134 of seating members 109-111 includes an upper section 136, a free end 137, and a protrusion 138 extending between the upper section 136 and the free end 137. As will be described in further detail below, the protrusion 138 extends outwardly away from the main body 102, and may be aligned with and engage an opening in a sidewall of the suspension frame. In some embodiments, the third section 134 of the seating member 108 includes only an extension member 140, which extends downward (e.g., along the y-axis), parallel to the second section 132. The extension member 140 is configured to engage an exterior surface of the suspension frame to provide further stability to the main body 102.

Similarly, each of seating members 112-114 of the first section 121 includes a first section 142 extending outwardly from the main body 102, for example, along the first plane defined by the top surface 124. A second section 144 extends perpendicularly, or substantially perpendicularly, from the first section 142, and a third section 146 extends from the second section 144. In some embodiments, the third section 146 of seating members 112-114 includes an upper section 147, a free end 148, and a protrusion 149 extending between the upper section 147 and the free end 148. As will be described in further detail below, the protrusion 149 may be aligned with and engage an opening in a sidewall of the suspension frame. As best shown in FIG. 4, in some embodiments, each of the seating members 109-114 extends vertically down to a same depth. Meanwhile, seating member 108 is generally shorter than seating members 109-114, and extends partially along an exterior of the suspension frame.

As more clearly shown in the bottom view of FIG. 3, the central opening 118 of the main body 102 may be snail-shaped. For example, a perimeter 155 defining central opening 118 includes a laterally extending irregularity or jut 156 provided to enable the main body 102 to be manufactured, for example, in the case the main body 102 is being made out of one piece of stamped steel and then folded. In the embodiment shown, the main body 102 includes a fasteners 120 disposed along the perimeter 155 on opposite sides of the central opening 118. The fasteners 120 engage/retain the sprinkler drop within the main body 102. In various embodiments, a variety of fasteners may be used to similarly hold the sprinkler drop in place.

Referring again to FIGS. 2-4, the support arm 104 will be described in greater detail. In some embodiments, the support arm 104 includes a shaft 158 and a second set of seating members 160-163 extending from the shaft 158. The shaft 158 is oriented perpendicular to the main body 102, and generally extends from the riser 127 between the first and second sections 121, 122 of the main body 102. The shaft 158 is aligned with the central opening 118 of the main body 102 to provide the sprinkler drop to the central opening 118 once assembled.

As shown, the seating members 160-163 extend downwardly from a bottom side 164 of the shaft 158 for engagement with a ceiling grid support element. Each of the seating members 160-163 includes a first section 166, which may be curved, extending outwardly (e.g., along the z-axis) from the shaft 158, and a second section 167 extending from the first section 166. The second section 167 is generally flat, and extends below the shaft 158. As shown, the second section 167 may be substantially parallel to the shaft 158. A third section 175 extends from the second section 167, and may be bent, angled, and/or include a protrusion 177 to engage the ceiling grid support element. As will be described in greater detail below, the seating members 160-163 are offset relative to one another so that the seating members 160-163 straddle the ceiling grid support element. In some embodiments, one or more of the seating members 160-163 may include an opening 169 to permit engagement with one or more fasteners used to secure the support arm 104 to the ceiling grid support element. Although four (4) seating members are shown, a greater or fewer number of seating members may be employed in alternative embodiments.

As further shown, the support arm 104 further includes a set of clamp members 171, 172 extending from an upper side 173 of the shaft 158. The clamp members 170, 171 may be curved and extend upwardly and outwardly from the support arm 104. The clamp members 171, 172 may extend outwardly in different directions (e.g., along the z-axis) relative to one another so that the clamp members 171, 172 support the sprinkler drop. Although two (2) clamp members are shown, a greater or fewer number clamp members may be employed in alternative embodiments.

Figure 5:
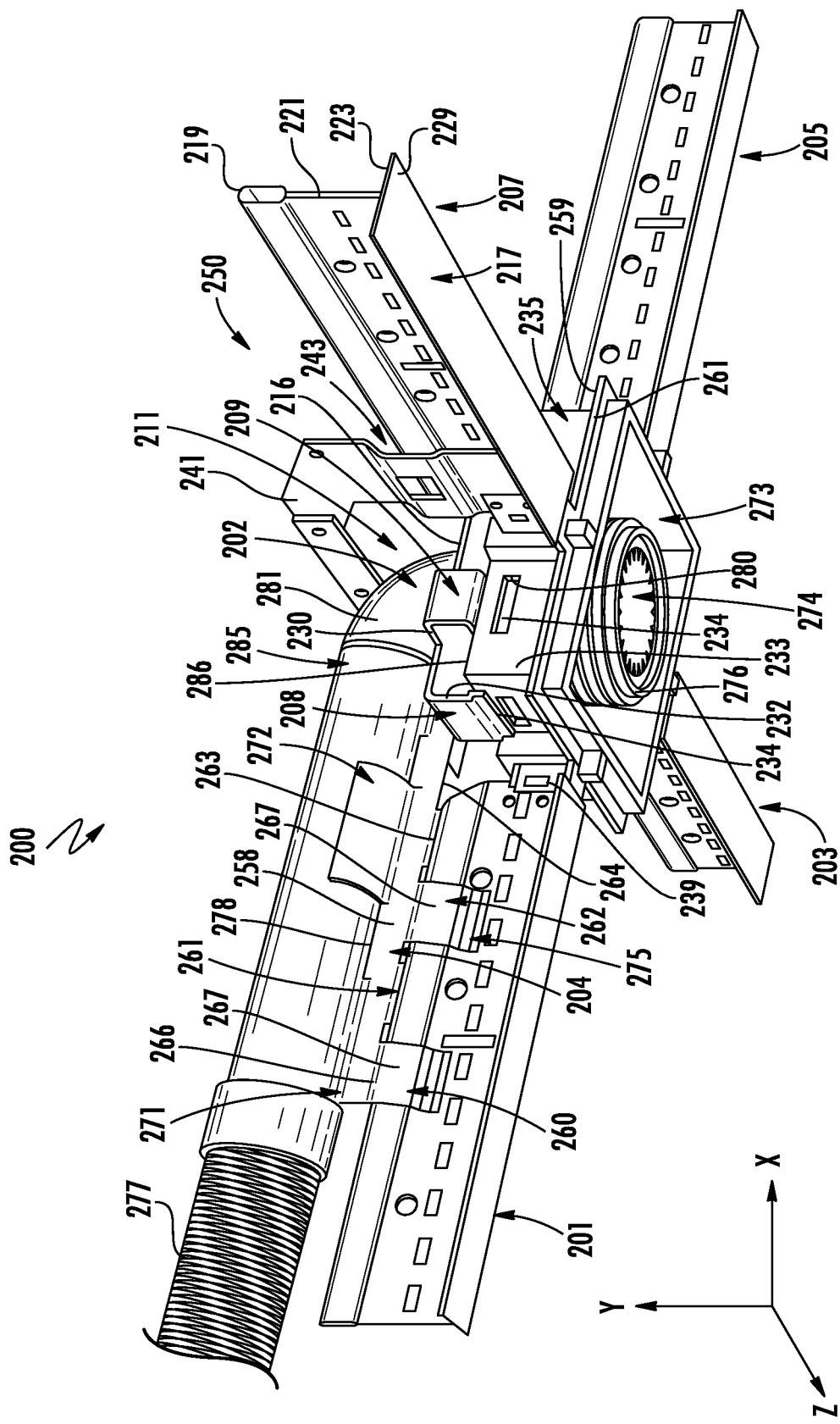
FIG. 5 is a perspective view of a fire sprinkler support assembly according to approaches of the disclosure.
Figure 6:
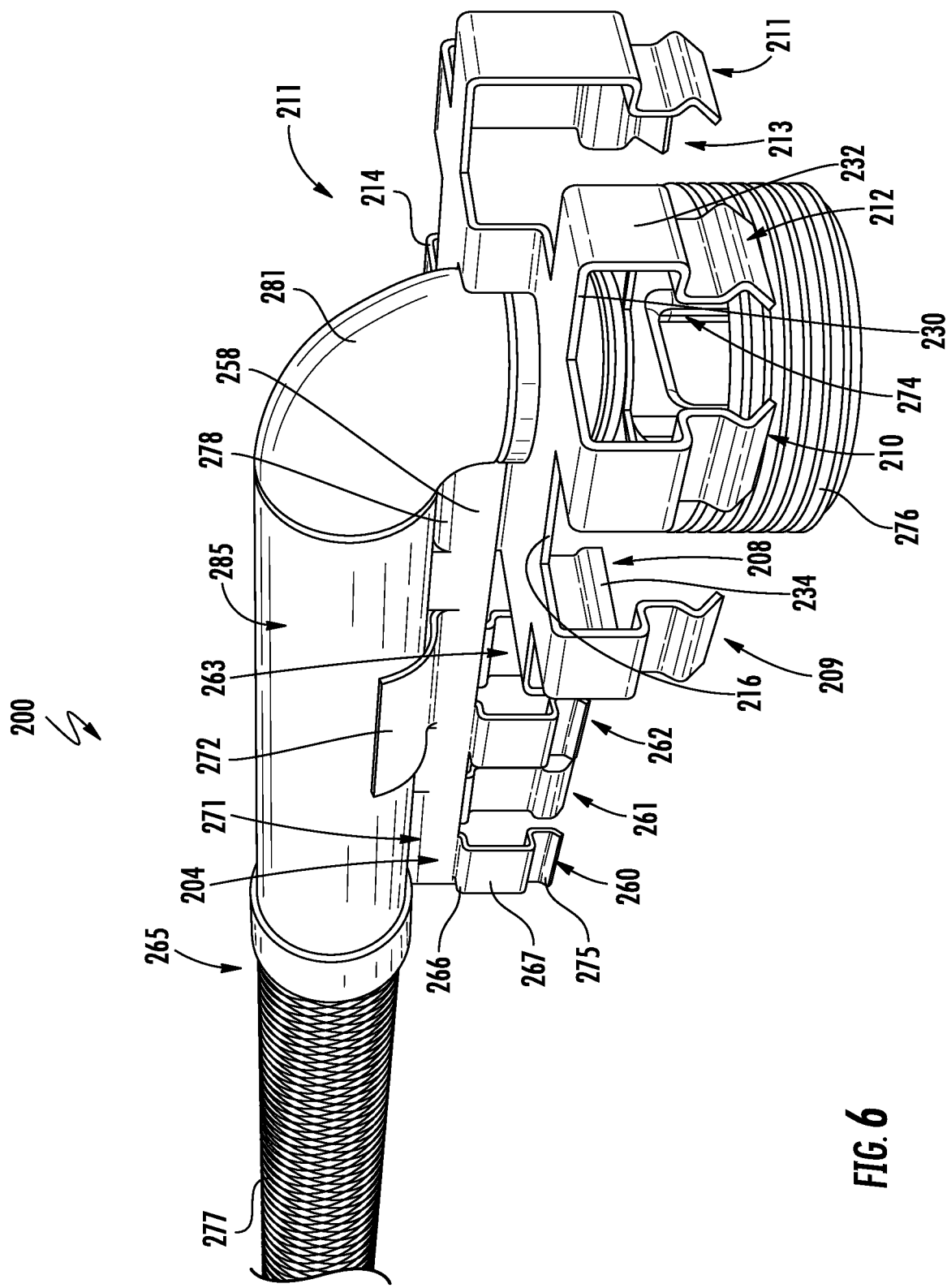
FIG. 6 is a perspective view of a bracket assembly according to approaches of the disclosure.

Turning now to FIGS. 5-6, a sprinkler support assembly (hereinafter "support assembly") 200 will be described in greater detail. FIG. 5 illustrates the entire support assembly 200, while FIG. 6 illustrates the support assembly 200 with certain components removed to better illustrate a fire sprinkler assembly 265 coupled to a bracket assembly 211. The bracket assembly 211, which may be the same or similar to the bracket assembly 100 of FIGS. 2-4, may be coupled to a suspension frame 235 and to a ceiling system 250 including one or more ceiling grid support elements 201, 203, 205, and 207. The ceiling grid support elements 201, 203, 205, and 207 may be arranged to form an array of grid openings which receive and are essentially closed by ceiling tiles or panels (not shown) when positioned within the grid openings.

Each of the ceiling grid support elements 201, 203, 205, and 207 may be t-shaped in a transverse cross-section and include a longitudinally-extending horizontal bottom flange 217, an enlarged stiffening channel 219 (also referred to as a bulb), and a vertical web 221 extending between the bottom flange 217 and the stiffening channel 219. In some embodiments, the stiffening channel 219 may be excluded. The bottom flange 217 has opposing portions which extend laterally outwards from the web 221 and terminate in opposed axially extending longitudinal edges. The web 221 may be centered between the longitudinal edges and vertically aligned beneath the stiffening channel 219. The bottom flange 217 also includes a top surface 223 and a bottom surface 229, wherein the top surface 223 provides a ledge for positioning and supporting a plurality of ceiling panels (not shown) thereupon.

In some embodiments, the ceiling system 250 may include a yoke 241 connected between two or more of ceiling grid support elements 201, 203, 205, and 207. For example, in the non-limiting embodiment shown, the yoke 241 may be secured to ceiling grid support elements 203 and 207 by one or more brackets 243, wherein the yoke 241 may be connected to a ceiling structure by a wire or cable (not shown). The brackets 243 may include a seating frame directly coupled to each ceiling grid support element 203 and 207, wherein the seating frame includes first and second seating members disposed on opposite sides of each ceiling grid support elements 203 and 207. In some embodiments, the first and second seating members straddle ceiling grid support elements 203 and 207. The seating frame of the brackets 243 provides stability to the support assembly yoke 241.

In some embodiments, the yoke 241 may be provided to support all components of the sprinkler support assembly 200. In other embodiments, some or all of the ceiling grid support elements 201, 203, 205, and 207 may also be suspended from an overlying building structure using, for example, flexible wire, and may be configured according to ASTM International standards. The standards may include, but are not limited to, those set forth in one or more of designations C635, C636 and E580, which are each incorporated herein by reference.

As shown, each of the ceiling grid support elements 201, 203, 205, and 207 are joined together by a suspension frame 235. The suspension frame 235 may be positioned centrally at an intersection of the ceiling grid support elements 201, 203, 205, and 207, wherein a set of connection clips 239 extend through a sidewall 233 of the suspension frame 235 to provide a code compliant connection therebetween. The suspension frame 235 further provides a central area/opening 273 for either a downlight or a sprinkler head 274. The suspension frame 235 may have a generally rectangular shape (top plan view) defined by the sidewall 233, and a cover (not shown) over the sprinkler head 274. The cover and the lower part of the suspension frame 235 may extend below a plurality of ceiling tiles (not shown) supported by an upper surface 259 of a ridge 261 extending around an outer surface of the sidewall 233. In the event of a fire, the cover is easily displaced. Although not limited to any particular type of light or lighting fixture, the suspension frame 235 may be suitable for use with an LED downlight.

However, according to embodiments of the present disclosure, the suspension frame 235 is used to support the fire sprinkler assembly 265 including supply pipes (not shown) and a sprinkler drop 285, which may be part of a fire suppression fluid delivery system. In some embodiments, the sprinkler drop 285 includes an elbow 281 coupled to the sprinkler head 274, which is surrounded by a baffle 276, and which is housed within the central area/opening 273 of the suspension frame 235. During operation, in the event of a fire, a thermally responsive device of the sprinkler head reacts to heat generated by the fire to allow fluid (e.g., water, nitrogen, and/or halogen) to flow through the sprinkler drop 285 and into the sprinkler head 274, where the fluid is dispersed outwardly to extinguish the fire.

In some embodiments, the sprinkler drop 285 is connected to a flexible conduit 277 including a flexible portion that comprises, for example, a corrugated tube, a hose, or a braided tube, which can be made from known materials including metal, rubber, etc. In one particular embodiment, the flexible conduit 277 is corrugated metal with a braided metal covering. The flexible conduit 277 may be flexible along its entire length, or may include one or more flexible portions adjacent more rigid portions. In one non-limiting embodiment, the flexible conduit may have a low elasticity so that when bent into a desired position, the flexible conduit it maintains its shape and does not return to its original position. In other embodiments, the conduit may be rigid or substantially rigid.

As further shown, the main body 202 of the bracket assembly 211 is coupled to the suspension frame 235, and the support arm 204 extends laterally (e.g., along the x-axis) from the main body 202 to support the sprinkler drop 285. The main body 202 includes a first set of seating members 208-214 extending laterally (e.g., along x-axis and z-axis) from the perimeter 216 of the main body 202. More specifically, each of seating members 208-214 includes a first section 230 extending outwardly from the main body 202, for example, along a plane defined by a top surface of the main body 202. A second section 232 extends perpendicularly, or substantially perpendicularly, from the first section 230, and a third section 234 extends from the second section 232. In some embodiments, the third section 234 includes a protrusion extending into an opening 280 in the sidewall 233 of the suspension frame 235 to align and secure the main body 202 to the suspension frame 235. The third section 234 of seating member 208 extends along the exterior surface of the sidewall 233 to provide further support for the main body 202. As further shown, one or more of the first set of seating members 208-214 engages a top surface 286 of the sidewall 233 of the suspension frame 235. In some embodiments, seating members 208-214 extend laterally beyond the sidewall 233 (e.g., in the x-z plane) to support the main body 202 and the sprinkler drop 285.

The support arm 204 includes a shaft 258 and a second set of seating members 260-263 extending from the shaft 258. The support arm 204 extends along a lengthwise axis (e.g., the x-axis) of the ceiling grid support element 201, wherein the lengthwise axis generally traverses along the vertical web 221 and/or the stiffening channel 219, between the flexible conduit 277 and the suspension frame 235. The shaft 258 is oriented perpendicular to the main body 202, and is aligned with the central opening of the main body 202 to guide the sprinkler drop 285 through the central opening during assembly. As shown, the seating members 260-263 generally extend downwardly from a bottom side 264 of the shaft 258 for engagement with ceiling grid support element 201. More specifically, a first section 266 and a second section 267 of each seating member 260-263 engages the stiffening channel 219, while a third section 275 engages the web 221 of ceiling grid support element 201. As arranged, the seating members 260-263 are offset relative to one another so that the seating members 260-263 are disposed on opposite sides of the ceiling grid support element 201.

The support arm 204 further includes the set of clamp members 271, 272 extending from the upper side 278 of the shaft 258. The clamp members 271, 272 may be curved and extend upwardly and outwardly from the shaft 258 to support the sprinkler drop 285. As shown, the clamp members 271, 272 may extend in opposite directions to cradle the sprinkler drop 285 therebetween.

In order to function effectively, the fire sprinkler assembly 265 must be held firmly in place during operation. Due to the significant back pressure of the fluid flowing therethrough, the sprinkler drop 285 may be subjected to significant side, rotational, and torsional forces, which are capable of changing the position of the fire sprinkler head extending from the sprinkler drop, thereby causing the fluid to be directed away from the intended target. It will be appreciated that the bracket assembly 211 is configured to resist movement of the sprinkler drop 285 by distributing the forces to the ceiling grid support elements 201, 203, 205, and 207 via the support arm 204 and the main body 202.

In some embodiments, each of the herein described bracket assemblies 100, 211 may include a barrier layer provided along one or more surfaces thereof. For example, a barrier layer including a set of plastic inserts may be formed along outer surfaces of the first and second sets of seating members. As shown, the plastic inserts may be open at a top thereof, and extend around the lower surfaces of the first and second sets of seating members. The inserts may increase durability and reduce friction between the first and second sets of seating member sand the beams of the ceiling system. Furthermore, in some embodiments, the plastic inserts may be useful for low-voltage suspended ceiling power distribution systems in which screws on the ceiling grids should not be used.

It will be appreciated that embodiments of the disclosure provide at least the following advantages. Firstly, the configuration of the seating elements of the main body and the support arm allows the bracket assembly to "snap" to the ceiling grid support element and to the suspension frame, thus allowing the fire sprinkler assembly to be installed faster, and potentially by hand, thus reducing tooling such as cordless drills and drivers. Secondly, the bracket assembly may be retrofit to existing downlight lighting suspension frames, thus providing symmetrical placement of sprinkler heads relative to lighting fixtures in grid-type ceiling systems employing lighting fixtures (e.g., downlights) at an intersection of two or more ceiling tiles.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

That which is claimed is:

1. A method for mounting a bracket assembly on a suspension frame, the method comprising:
   attaching a main body of the bracket assembly to the suspension frame comprising engaging a set of main body seating members with the suspension frame, the set of main body seating members extending downwards from an outer perimeter of the main body;
   attaching a support arm of the bracket assembly to a ceiling grid support element of the suspension frame comprising engaging a set of seating members with the ceiling grid support element, the set of seating members extending downwards from a shaft of the support arm, the support arm extending outward from the main body, the set of seating members distributed along a length of the shaft, the set of seating members comprising a first seating member and a second seating member, the first seating member positioned between the main body and the second seating member; and
   coupling a sprinkler drop to the bracket assembly comprising engaging the sprinkler drop with a clamp member extending upwards from the bracket assembly.

2. The method of claim 1, wherein attaching the main body of the bracket assembly to the suspension frame comprises positioning the main body over a central area of the suspension frame.

3. The method of claim 1, further comprising covering a central area of the suspension frame at least partially with the main body.

4. The method of claim 1, wherein coupling the sprinkler drop to the bracket assembly comprises engaging the sprinkler drop with a central opening of the main body.

5. The method of claim 1, wherein coupling the sprinkler drop to the bracket assembly comprises:
   positioning a sprinkler head of the sprinkler drop within a central area defined by the suspension frame; and
   positioning a portion of the sprinkler drop above the support arm, the portion of the sprinkler drop extending laterally away from the sprinkler head along the support arm.

6. The method of claim 5, wherein the portion of the sprinkler drop is connected to the sprinkler head by an elbow.

7. The method of claim 1, wherein the clamp member extends upwards from the support arm.

8. The method of claim 1, wherein:
   the set of main body seating members comprises a first main body seating member and a second main body seating member; and
   the first main body seating member is positioned between the clamp member and the second main body seating member.

9. The method of claim 1, wherein the first seating member is positioned between the clamp member and the main body.

10. A method for mounting a bracket assembly on a suspension frame, the method comprising:
    attaching a main body of the bracket assembly to the suspension frame comprising contacting the main body with the suspension frame;
    attaching a support arm of the bracket assembly to a ceiling grid support element of the suspension frame comprising engaging a set of seating members with the ceiling grid support element, the set of seating members extending downwards from a shaft of the support arm, the support arm extending outward from the main body, the set of seating members distributed along a length of the shaft, the set of seating members comprising a first seating member and a second seating member, the first seating member positioned between the main body and the second seating member; and
    coupling a sprinkler drop to the bracket assembly comprising engaging the sprinkler drop with a clamp member extending upwards from the bracket assembly.

11. The method of claim 10, wherein attaching the main body of the bracket assembly to the suspension frame comprises positioning the main body over a central area of the suspension frame.

12. The method of claim 10, further comprising covering a central area of the suspension frame at least partially with the main body.

13. The method of claim 10, wherein coupling the sprinkler drop to the bracket assembly comprises engaging the sprinkler drop with a central opening of the main body.

14. The method of claim 10, wherein attaching the main body of the bracket assembly to the suspension frame comprises engaging a set of main body seating members with the suspension frame, the set of main body seating members extend downwards from an outer perimeter of the main body.

15. The method of claim 10, wherein coupling the sprinkler drop to the bracket assembly comprises:
- positioning a sprinkler head of the sprinkler drop within a central area defined by the suspension frame; and
- positioning a portion of the sprinkler drop above the support arm, the portion of the sprinkler drop extending laterally away from the sprinkler head along the support arm.

16. The method of claim 15, wherein the portion of the sprinkler drop is connected to the sprinkler head by an elbow.

17. The method of claim 10, wherein the clamp member extends upwards from the support arm.

18. The method of claim 10, wherein the first seating member is positioned between the clamp member and the main body.

\* \* \* \* \*